US012086249B2

(12) United States Patent
Chiueh et al.

(10) Patent No.: US 12,086,249 B2
(45) Date of Patent: Sep. 10, 2024

(54) DETECTION SYSTEM, DETECTION METHOD, AND AN UPDATE VERIFICATION METHOD PERFORMED BY USING THE DETECTION METHOD

(71) Applicant: INDUSTRIAL TECHNOLOGY RESEARCH INSTITUTE, Hsinchu (TW)

(72) Inventors: Tzi-Cker Chiueh, Taipei (TW); Lap-Chung Lam, Hsinchu (TW); Li-Ting Huang, Hsinchu (TW); Pan-Jo Chuang, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 821 days.

(21) Appl. No.: 16/777,056

(22) Filed: Jan. 30, 2020

(65) Prior Publication Data

US 2021/0081533 A1    Mar. 18, 2021

(30) Foreign Application Priority Data

Sep. 18, 2019 (TW) ................................ 108133679

(51) Int. Cl.
*G06F 21/56* (2013.01)
*G06F 8/65* (2018.01)

(52) U.S. Cl.
CPC .............. *G06F 21/566* (2013.01); *G06F 8/65* (2013.01); *G06F 2221/033* (2013.01)

(58) Field of Classification Search
CPC ....... H04L 63/20; H04L 63/101; H04L 63/10; H04L 67/34; G06F 21/51; G06F 21/56;
(Continued)

(56) References Cited

U.S. PATENT DOCUMENTS 7,640,589 B1    12/2009  Mashevsky et al.
8,332,946 B1 *  12/2012  Boisjolie ............... H04L 63/145
                                                                  726/24
(Continued)

FOREIGN PATENT DOCUMENTS

CN    101788915 A    7/2010
CN    102736978 A    10/2012
(Continued)

OTHER PUBLICATIONS

Decato, "Increasing the Security on Non-Networked Ground Support Equipment", 2016 IEEE, total 5 pages.
(Continued)

*Primary Examiner* — Tae K Kim
(74) *Attorney, Agent, or Firm* — Birch, Stewart, Kolasch & Birch, LLP (57) ABSTRACT

A detection system for determining whether an update of at least one application installed on at least one whitelisted host is legitimate is provided. The system includes an update management server and update detectors installed with the application(s). During a process that software automatic update occurs in each update detector and a corresponding update installation package is executed, the executed update installation package generates at least one updater corresponding to each application. Each update detector transmits report information which includes the information of the at least one updater and sampled executable files to the update management server. The update management server obtains a number of update detectors, having performed the update operation of each application, according to the report information of each update detector. If the number is greater than or equal to a threshold value, it is determined that the update is legitimate.

10 Claims, 8 Drawing Sheets

(58) Field of Classification Search
CPC .............. G06F 21/566; G06F 21/50; G06F 2221/2141; G06F 2201/88; G06F 2201/865; G06F 2221/033
See application file for complete search history.

(56) References Cited

U.S. PATENT DOCUMENTS

| | | | | |
|---|---|---|---|---|
| 8,863,232 | B1* | 10/2014 | Tidd | G06F 16/176 726/4 |
| 9,417,866 | B2* | 8/2016 | Morley | H04L 67/02 |
| 9,766,914 | B2* | 9/2017 | Kotani | G06F 9/45558 |
| 10,089,469 | B1* | 10/2018 | Roundy | G06F 21/64 |
| 10,228,929 | B2 | 3/2019 | El-Moussa et al. | |
| 10,873,588 | B2* | 12/2020 | Woodworth, Jr. | H04L 63/101 |
| 2006/0150256 | A1* | 7/2006 | Fanton | H04L 63/145 726/27 |
| 2009/0125985 | A1* | 5/2009 | Traenkenschuh | G06F 21/51 726/4 |
| 2011/0047597 | A1* | 2/2011 | Mahaffey | H04L 63/10 709/219 |
| 2011/0302623 | A1* | 12/2011 | Ricci | G06F 21/121 726/1 |
| 2012/0030731 | A1 | 2/2012 | Bhargava et al. | |
| 2013/0290729 | A1* | 10/2013 | Pettigrew | G06F 21/52 713/189 |
| 2013/0333039 | A1* | 12/2013 | Kelly | H04L 63/20 726/22 |
| 2014/0090077 | A1 | 3/2014 | Jeong et al. | |
| 2014/0096203 | A1* | 4/2014 | Takahashi | H04L 63/101 726/4 |
| 2015/0040246 | A1* | 2/2015 | Yuen | H04L 63/0876 726/30 |
| 2015/0339475 | A1 | 11/2015 | Feroz et al. | |
| 2016/0162275 | A1* | 6/2016 | Morley | H04L 67/02 717/170 |
| 2016/0323106 | A1* | 11/2016 | Roper | G06F 21/57 |
| 2016/0337390 | A1 | 11/2016 | Sridhara et al. | |
| 2017/0351862 | A1* | 12/2017 | Mohinder | G06F 21/57 |
| 2018/0089430 | A1* | 3/2018 | Mayo | G06F 21/577 |
| 2018/0189478 | A1* | 7/2018 | Richardson | H04W 12/122 |
| 2018/0253545 | A1* | 9/2018 | Huang | G06F 8/60 |
| 2018/0307840 | A1* | 10/2018 | David | G06F 21/64 |
| 2018/0359244 | A1* | 12/2018 | Cockerill | H04L 63/12 |
| 2019/0080080 | A1* | 3/2019 | Ogura | G06F 21/572 |
| 2019/0156014 | A1* | 5/2019 | Lin | G06F 21/45 |
| 2019/0205530 | A1 | 7/2019 | Brown | |
| 2019/0303579 | A1* | 10/2019 | Reddy | H04L 9/50 |
| 2020/0167473 | A1* | 5/2020 | Polyakov | G06F 21/54 |
| 2020/0177444 | A1* | 6/2020 | Nelson-Gal | H04L 67/56 |
| 2020/0304454 | A1* | 9/2020 | Yu | H04L 63/101 |
| 2020/0311270 | A1* | 10/2020 | Gryaznov | G06F 21/561 |

FOREIGN PATENT DOCUMENTS

| | | |
|---|---|---|
| CN | 103365770 A | 10/2013 |
| CN | 105183504 A | 12/2015 |
| CN | 106970696 A | 7/2017 |
| KR | 10-1965213 B1 | 4/2019 |
| TW | 201502845 A | 1/2015 |
| TW | 201830282 A | 8/2018 |

OTHER PUBLICATIONS

Gates et al., "CodeShield: Towards Personalized Application Whitelisting", ACSAC '12 Dec. 3-7, 2012, Orlando, Florida, pp. 279-288.

Huh et al., "Managing application whitelists in trusted distributed systems", Future Generation Computer Systems, 2011, vol. 27, pp. 211-226.

Pareek et al, "Application Whitelisting: Approaches and Challenges", International Journal of Computer Science, Engineering and Information Technology (IJCSEIT), Oct. 2012, vol. 2, No. 5, pp. 13-18.

Powers et al., "Whitelist Malware Defense for Embedded Control System Devices", IEEE, 2015 Saudi Arabia Smart Grid (SASG), pp. 1-6.

Romana et al., "Practical Application Whitelisting", ResearchGate, Jan. 2015, total 7 pages.

Turaev et al., "Prevention of Ransomware Execution in Enterprise Environment on Windows OS: Assessment of Application Whitelisting Solutions", 2018 1st International Conference on Data Intelligence and Security, pp. 110-118.

Taiwanese Office Action and Search Report for Taiwanese Application No. 108133679, dated Sep. 3, 2020.

Chinese Office Action and Search Report for Chinese Application No. 201910954453.0, dated Feb. 8, 2024.

* cited by examiner

DETECTION SYSTEM, DETECTION METHOD, AND AN UPDATE VERIFICATION METHOD PERFORMED BY USING THE DETECTION METHOD

This application claims the benefit of Taiwan application Serial No. 108133679, filed Sep. 18, 2019, the subject matter of which is incorporated herein by reference.

TECHNICAL FIELD

The disclosure relates in general to a detection system, the detection method, and an update verification method performed by using the detection method.

BACKGROUND

Along with the escalation of hacker attack methods, the number of malicious software grows rapidly. The current protection concept is based on application whitelisting, which executes only the software listed on the application whitelist and blocks all unknown programs. The whitelist is a default denying mechanism. All necessary execution files must be listed in the whitelist. Although the application whitelisting concept is a good idea, problems may occur during automatic update. Since new executable files are not listed in the application whitelist, the updated application will be blocked and cannot be executed.

For example, when an application is upgraded to version 3 from version 2, executable files for the version 3 application are not listed in the application whitelist yet, and the application which was originally executable will become non-executable. Meanwhile, to make the upgraded application executable, a suitable method is required to add the new executable files for the version 3 application to the application whitelist. However, it is very dangerous to accept new executable files unconditionally because the new executable files may be malicious. Therefore, it has become a prominent task for the industry to provide a solution to resolve the above problem that an upgraded application cannot be operated if corresponding executable files are not listed in the application whitelist.

SUMMARY

According to an embodiment, a detection system for determining whether an update of at least one application installed on at least one whitelisted host is legitimate is provided. The system includes an update management server and a number of update detectors. Each update detector is installed with at least one application. During a process that software automatic update occurs in each update detector and a corresponding update installation package is executed for performing an update operation of the at least one application, the executed update installation package correspondingly generates at least one updater. Each update detector checks a download source of the update installation package and transmits report information to the update management server. The report information includes the information of the at least one updater and sampled executable files. The update management server obtains a number of detectors, in which automatic application update occurs and by which the update installation package is executed, according to the report information of each update detector. When the number of update detectors having performed the update operation is greater than or equivalent to a threshold value, the update management server determines that the update is legitimate.

According to another embodiment, a detection method for determining whether an update of at least one application installed on at least one whitelisted host is legitimate is provided. The method includes the following steps. Firstly, an update management server and a number of update detectors are provided. Each update detector is installed with at least one application. During a process that software automatic update occurs in each update detector and a corresponding update installation package is executed for an update of at least one application, the executed update installation package correspondingly generates at least one updater. Each update detector checks a download source of the update installation package and transmits report information to the update management server. The report information includes the information of the at least one updater and sampled executable files. Then, the update management server obtains a number of detectors having performed the update operation of the at least one application by using the update installation package according to the report information of each update detector. If the number of update detectors having performed the update operation is greater than or equivalent to a threshold value, the update management server determines that the current update is legitimate.

According to an alternate embodiment, an update verification method performed by using the detection method is provided. The update verification method is performed by a preconfigured whitelisted host of at least one whitelisted host. The update verification method includes the following steps. Firstly, the preconfigured whitelisted host receives an updater list, and enters a verification process over a period of the time when file activities are in an idle state. During the verification process, the preconfigured whitelisted host looks up an execution log and checks whether all of the at least one candidate updater of the updater list has been tracked. If no, it is determined that the update is incomplete. During the verification process, the preconfigured whitelisted host looks up an application whitelist of the preconfigured whitelisted host and checks whether each of at least one sample executable file is already listed in the application whitelist of the preconfigured whitelisted host. If no, it is determined that the update is incomplete. Then, when the preconfigured whitelisted host determines that the update is incomplete, the preconfigured whitelisted host downloads the update installation package from the update management server and executes the downloaded update installation package to re-activate update process and collect new executable files.

The above and other aspects of the disclosure will become better understood with regards to the following detailed description of the preferred but non-limiting embodiment (s). The following description is made with reference to the accompanying drawings.

DETAILED DESCRIPTION

Figure 1:
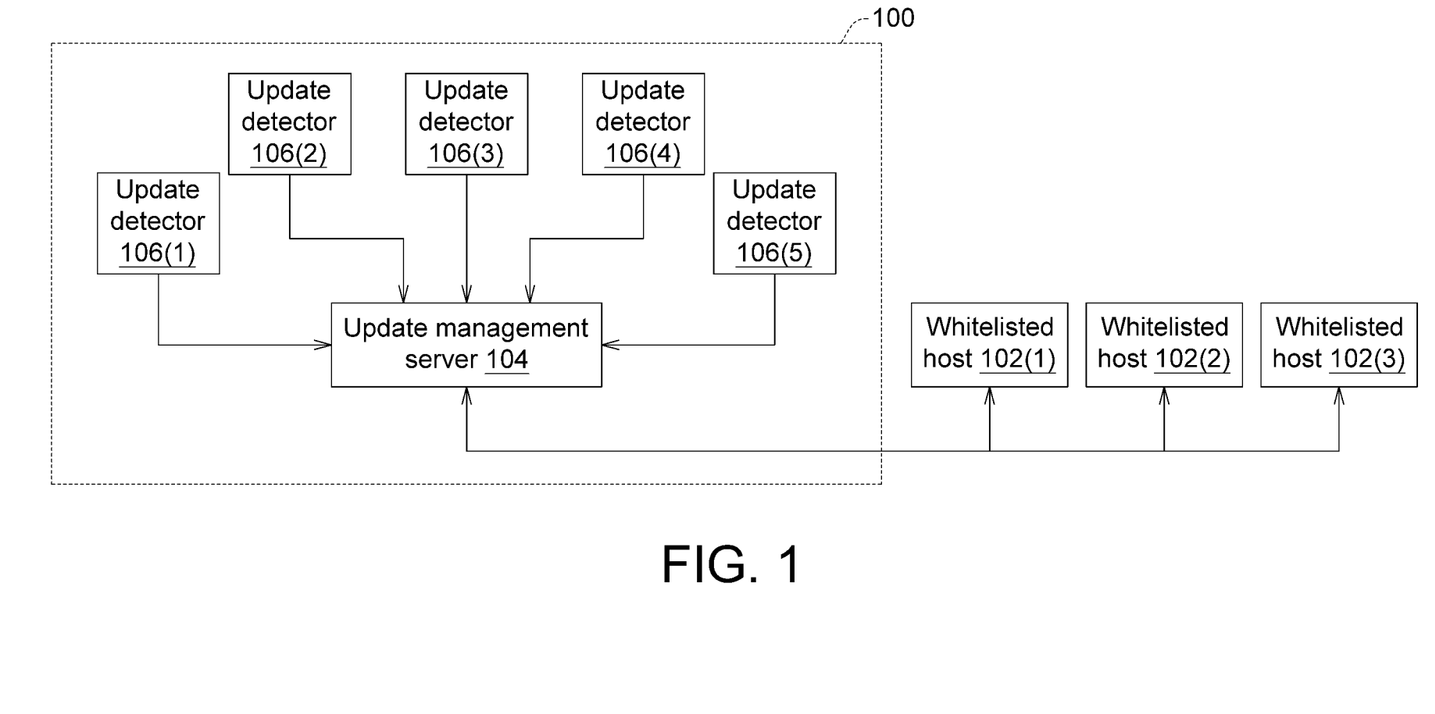
FIG. 1 is a schematic diagram of a detection system according to an embodiment of the disclosure.

Referring to FIG. 1, a schematic diagram of a detection system 100 according to an embodiment of the disclosure is shown. The detection system 100 is for determining whether an update of at least one application installed on at least one whitelisted host 102 is legitimate. The detection system 100 includes an update management server 104 and a number of update detectors 106. Each update detector 106 is installed with the at least one application. During a process that software automatic update occurs in each update detector 106 and a corresponding update installation package is executed for performing an update operation of at least one application, the executed update installation package correspondingly generates at least one updater. Each update detector 106 checks a download source of the update installation package and transmits report information to the update management server 104. The report information includes information of the at least one updater and sampled executable files.

The update management server 104 obtains a number of update detectors having performed the update operation of the at least one application by using the update installation package according to the report information of each update detector 106. In an embodiment, the number of update detectors corresponds to the number of update detectors having performed the update operation of the at least one application by using the update installation package within a time interval relevant to a current time point or at a time point relevant to the current time point. If the number of update detectors having performed the update operation is greater than or equivalent to a threshold value, the update management server 104 determines that this update is legitimate.

When at least one whitelisted host 102 wants to perform the update operation of at least one application, the update management server 104 further receives an inquiry from the at least one whitelisted host 102, and transmits a legitimate updater list to the at least one whitelisted host according to a determination of whether a collected updater list is legitimate.

Thus, after the update management server 104 determines the legitimate updater list, if automatic update occurs to the at least one application of the at least one whitelisted host 102 and the update installation package is downloaded for performing an update operation of the at least one application, for each newly created process, whether the updater is legitimate is checked. If it is determined that the updater is legitimate, the updater is tracked, and new execution files are generated and added to the whitelist. Thus, the at least one whitelisted host 102 will not execute illegitimate update installation packages to perform an update operation of the at least one application.

As indicated in FIG. 1, the at least one whitelisted host 102 includes whitelisted hosts 102(1)~102(3), and the update detectors 106 include update detectors 106(1)~106 (5), but the present embodiment is not limited thereto. The at least one whitelisted host 102 may include other number of whitelisted hosts, and the update detectors 106 may include other number of update detectors. The whitelisted host 102 is a general designation of the whitelisted hosts 102(1)~102(3) and may refer to any of the whitelisted hosts 102(1)~102(3). The update detector 106 is a general designation of the update detectors 106(1)~106(5) and may refer to any of the update detectors 106(1)~106(5).

Furthermore, the update management server 104 may generate an updater list according to the report information transmitted by each update detector 106. The updater list contains at least one candidate updater and sampled executable files. The at least one candidate updater is the updater which is shown in each of the report information of the update detectors 106 having transmitted the report information to the update management server 104.

When the at least one whitelisted host 102 performs an update operation of at least one application, the update management server 104 further receives an inquiry from the at least one whitelisted host 102, and provides the updater list to at least one whitelisted host 102, which updates an application whitelist of the at least one whitelisted host 102 according to the updater list.

The version of the at least one application installed on each update detector 106 is the same as the version of the at least one application installed on at least one whitelisted host 102. The version of the operating system installed on each update detector 106 is the same as the version of the operating system installed on at least one whitelisted host 102. The executed update installation package is unzipped or unpacked to generate the at least one updater, which further generates new executable files. The update detectors 106 pre-create a software environment which is the same as the software environment of the whitelisted host 102. That is, the software environment of the update detectors and the software environment of the whitelisted host 102 have the same operating system version and the same application version, and execute the same programs. Whether the update detectors 106 execute the update installation package is observed and whether the download source of the update installation package is safe is checked before transmitting the information, such that the update management server 104 can determine whether the update is legitimate according to the time state at which the update detectors 106 execute the update installation package.

Figure 2:
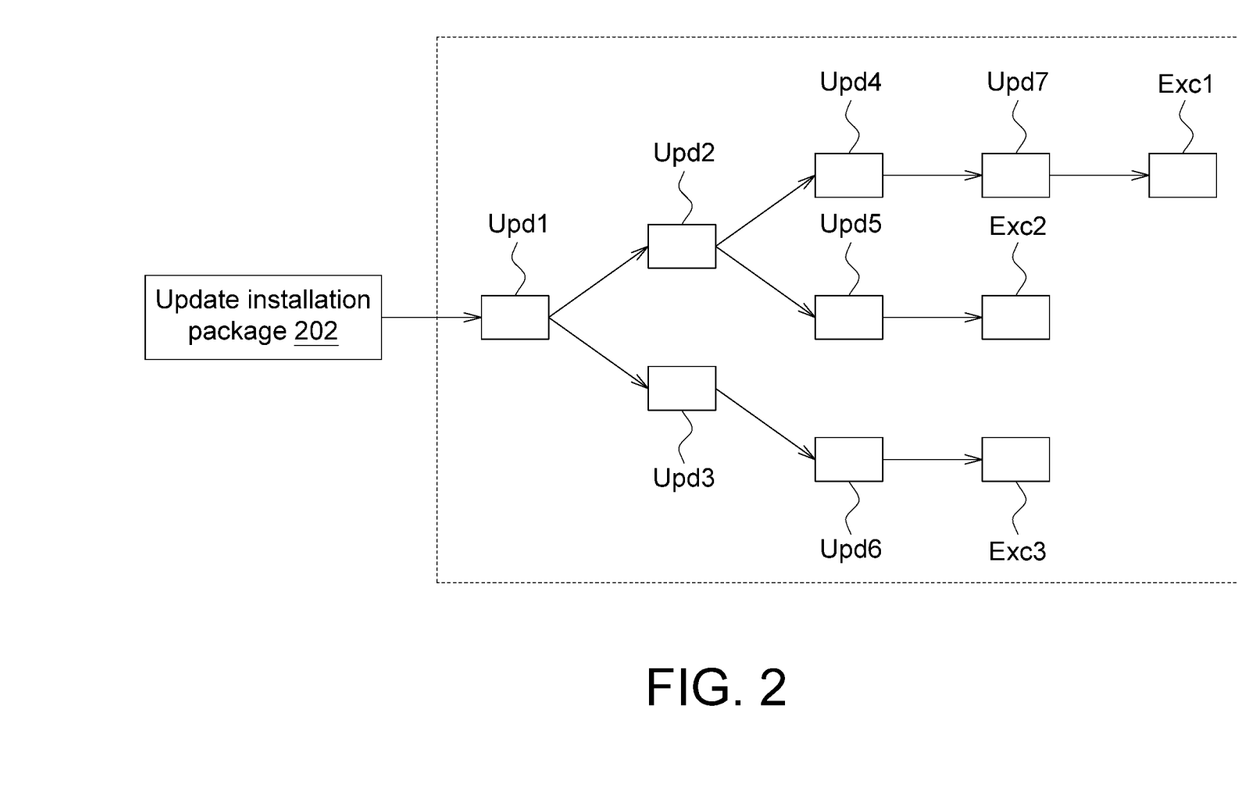
FIG. 2 is an example of updaters generated by executing an update installation package.

Referring to FIG. 2, an example of updaters generated by executing an update installation package is shown. When the update detector 106 is installed with at least one application and knows that the update version of the at least one application has been announced, the update detectors 106 (1)~106(5) automatically download the update installation package 202 from the network, and each update detector 106 executes the update installation package for performing an update operation of the at least one application. The executed update installation package correspondingly generates at least one updater. To put it in greater details, after the update detectors 106(1)~106(5) execute the update installation package 202, the update installation package 202 will be unzipped or unpacked to generate a file Upd1. After the update installation package 202 is unzipped or unpacked, an update package Upck1 is also generated. Or, the update package Upck1 can be downloaded from the network by the update detector 106. After the file Upd1 is executed in conjunction with the update package Upck1, files Upd2 and Upd3 are generated. The files Upd2 and Upd3 are obtained after the file Upd1 is unzipped or unpacked in conjunction with the update package Upck1. After the file Upck1 is executed, an update package Upck3 is concurrently generated. Or, the update package Upck3 can be downloaded from the network by the update detector 106. After the file Upd2 is executed, files Upd4 and Upd5 are generated. After the file Upd3 is executed in conjunction with the update package Upck3, a file Upd6 is generated. After the file Upd4 is executed, a file Upd7 is generated. After the file Upd7 is executed, a number of executable files Exc1 are generated. After the file Upd5 is executed, a number of executable files Exc2 are generated. After the file Upd6 is executed, a number of executable files Exc3 are generated. The executable files Exc1, Exc2, and Exc3 can be executable files with file extensions "exe", "dll", or "sys". The above files Upd1~Upd7 can be executed alone or in conjunction with the update package by way of unzipping or unpacking, for example.

If the update installation package 202 is an executable file (for example, with file extension "exe"), and the files Upd1~Upd7 generated by the executed update installation package 202 also are executable files (for example, with file extension "exe"), the files Upd1~Upd7 can be regarded as updaters. In the descriptions below, the updaters Upd1~Upd7 are exemplified by the files Upd1~Upd7.

Figure 3:
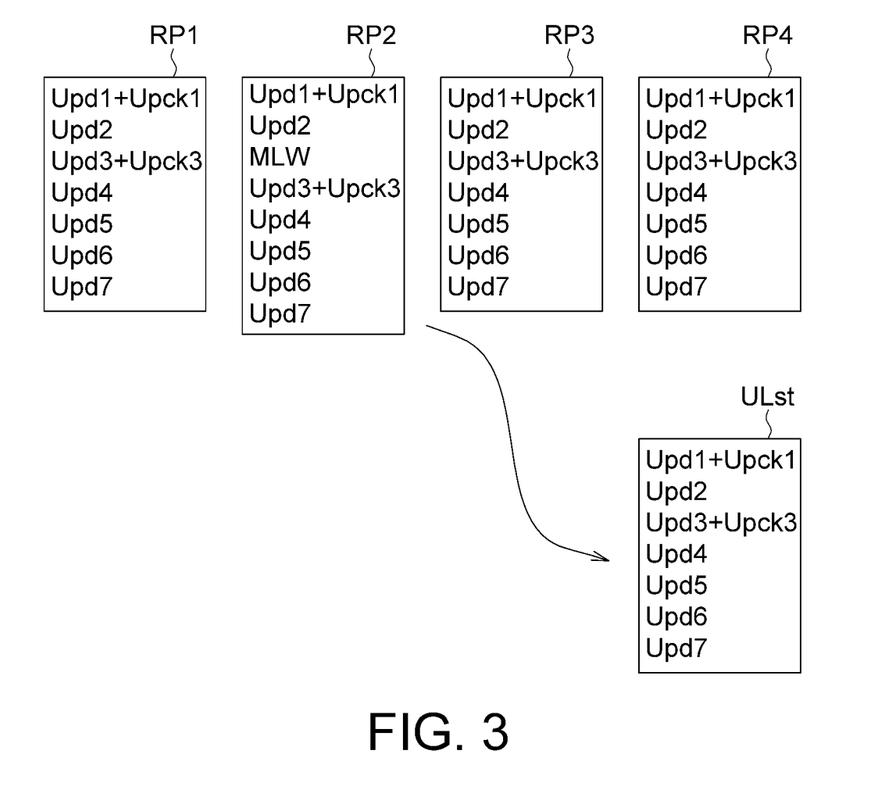
FIG. 3 is an example of an updater list generated by an update management server.

Referring to FIG. 3, an example of an updater list generated by an update management server is shown. After each update detector 106 executes the update installation package for performing an update operation of the at least one application, each update detector 106 transmits a report information including the information of the at least one updater to the update management server 104. For example, the update detector 106(1) transmits a report information RP1 to the update management server 104, and the update detectors 106(2)~106(4) respectively transmit report information RP2~RP4 to the update management server 104. The report information RP1 records the updaters Upd1~Upd7 generated from the update installation package executed by the update detector 106(1) as well as the update package Upck1 executed in conjunction with the file Upd1 and the update package Upck3 executed in conjunction with the file Upd3. Similarly, the report information RP2~RP4 record the updaters Upd1~Upd7 generated from the update installation package executed by the update detector 106(2)~106(4) as well as the update package Upck1 executed in conjunction with the file Upd1 and the update package Upck3 executed in conjunction with the file Upd3. However, the report information RP2 further includes a program MLW.

After receiving the report information RP1~RP4 from the update detectors 106(1)~106(4), the update management server 104 obtains a number of update detectors 106 (such as 4) having performed the update operation of the at least one application by using the update installation package. Let the threshold value be 4. Since the number of update detectors being 4 is greater than or equal to the threshold value being 4, the update management server 104 determines that the update installation package 202 is legitimate.

In an embodiment, the number of update detectors corresponds to the number of update detectors having performed the update operation of the at least one application by using the update installation package within a time interval relevant to a current time point. The time interval is different from the current time point by such as a week or a month. That is, the number of update detectors corresponds to the number of update detectors having performed the update operation of at least one application by using the update installation package within the recent week or the recent month. In another embodiment, the number of update detectors corresponds to a time point relevant to the current time point.

The reason for determining the update as a legitimate update is as follows. If the update installation package for updating the at least one application is indeed officially announced by the software publisher, there should be many hosts or computers downloading the update installation package for performing the upgrading or the update of the specific application software within a recent period of the time. By using a number of clean update detectors to simulate the operation of the host or the computer, if the update installation package is downloaded by more than a certain number of update detectors, this indicates that it is very likely the update installation package is the officially announced legitimate program for performing the upgrading or the update of the specific application software. If the number of the update detectors 106 observed by the update management server 104 is greater than or equal to a threshold value (the software environment of the update management server 104 is the same as the software environment of the whitelisted host 102), the update management server 104 can determine whether the update is legitimate. Thus, whether the update is legitimate is determined by a majority vote (that is, the number of update detectors 106 performing the update installation package is greater than or equal to a threshold value).

The update management server 104 further generates an updater list ULst according to the report information RP1~RP4 transmitted by each of the update detectors 106 (1)~106(4). The updater list ULst includes at least one candidate updater, which includes the updaters Upd1~Upd4 shown in each of the report information RP1~RP4 and the update packages Upck1 and Upck3 respectively used in conjunction with the updaters Upd1 and Upd3. Since the program MLW of the report information RP2 is merely shown in the report information RP2 and is not shown in remaining report information RP1, RP3 and RP4, the update management server 104 determines that the program MLW is a suspicious and malicious software and does not add it to the updater list ULst. The reason for determining the program MLW as a suspicious and malicious software and not adding it to the updater list ULst is as follows. Since the same executed update installation package 202 should generate the same updater(s), the updater(s) shown in each of the report information RP1~RP4 should be the same. Therefore, the update management server 104 adds to the updater list ULst only the updaters Upd1~Upd7 and the update packages Upck1 and Upck3 shown in each of the report information RP1~RP4 but not the suspicious program MLW. Therefore, the updater list ULst only includes reliable updaters that can be added to the application whitelist of the at least one whitelisted host 102. Here, suspicious programs or malicious software are filtered out by using the "intersection" method (that is, only the updaters Upd1~Upd7 and the update package Upck1 and Upck3 shown in each of the report information RP1~RP4 are added to the updater list ULst) to obtain safe and reliable updaters.

Figure 4:
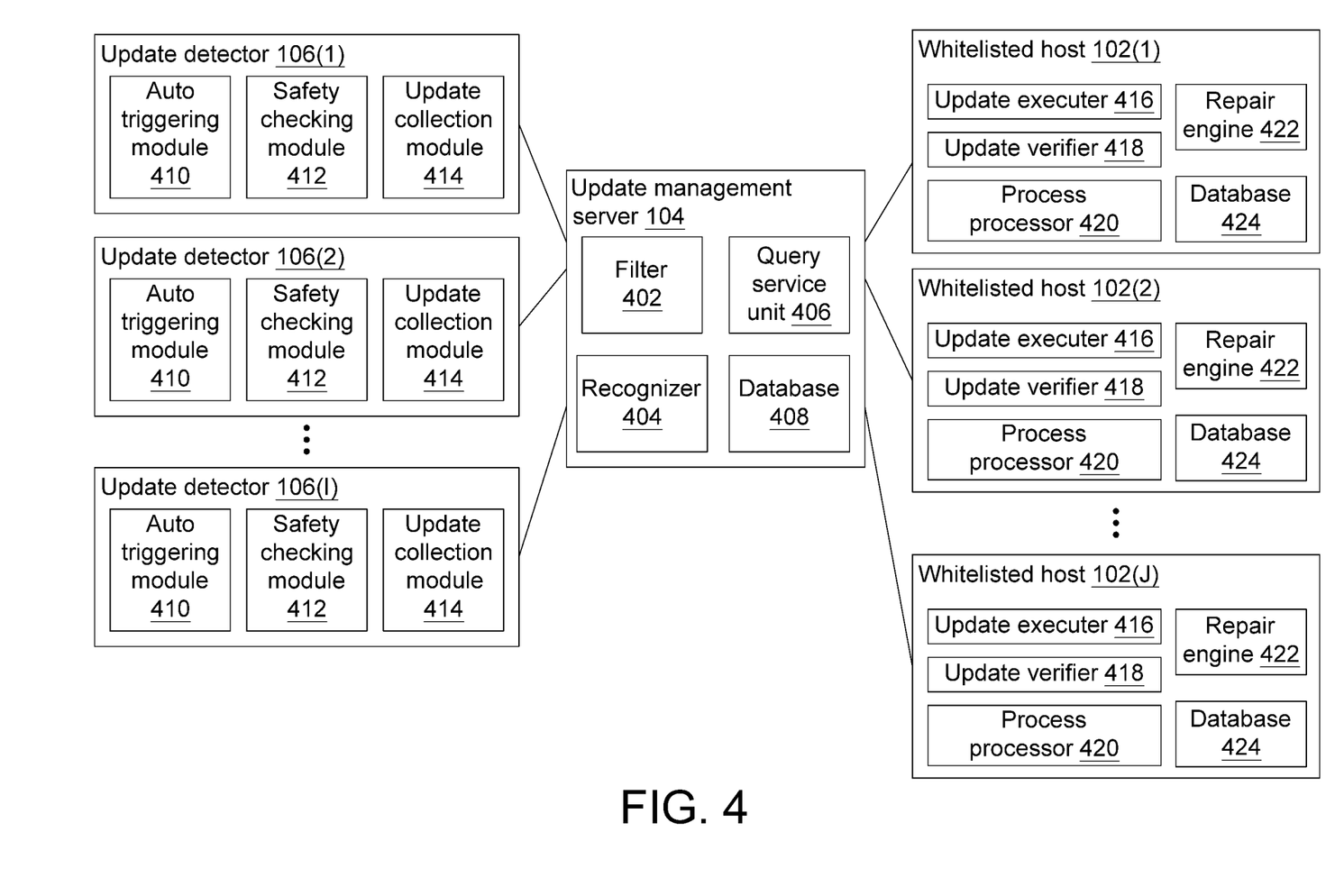
FIG. 4 is an example of detailed structures of an update management server, an update detector, and a whitelisted host.

Referring to FIG. 4, an example of detailed structures of an update management server, an update detector, and a whitelisted host is shown. The update management server 104 includes a filter 402, a recognizer 404, a query service unit 406 and a database 408. The filter 402 configured to filter out illegitimate programs in the report information RP1~RP4 to generate an updater list. The recognizer 404 determines whether the update installation package 202 is legitimate according to the number of update detectors having performed the update operation recently. The query service unit 406 receives an inquiry from the at least one whitelisted host 102, transmit a legitimate updater list to at least one whitelisted host and replies whether the update installation package 202 is legitimate to at least one whitelisted host. The database 408 stores the updater list UPst.

Each update detector 106 includes an auto triggering module 410, a safety checking module 412, and an update collection module 414. The auto triggering module 410 automatically activates the update operation of the at least one application. The safety checking module 412 assures that the download source of the update installation package 202 is a reliable installation source. The update collection module 414 collects the information of the at least one updater and uses the information of the at least one updater as the report information. In FIG. 4, the update detectors 106 are exemplified by update detectors 106(1)~106(1), wherein I is a positive integer.

The whitelisted host 102 includes an update executer 416, an update verifier 418, a process processor 420, a repair engine 422 and a database 424. The update executer 416 executes an update operation of the at least one application by the update installation package. The update verifier 418 verifies whether the update operation of the at least one application is completely executed. The process processor 420 executes the updater and generates a corresponding process or corresponding processes. If the update operation of the at least one application is not complete, the repair engine 422 repairs the update operation. The database 424 stores the updated application whitelist of the whitelisted host 102. In FIG. 4, the whitelisted hosts 102 are exemplified by whitelisted host s102(1)~102(J), wherein J is a positive integer.

The actions performed by the update management server 104, the update detector 106, and the whitelisted host 102 are as follows. In the updater collection step, the auto triggering module 410 continuously re-boosts the corresponding update detector 106 or re-activates the at least one application by using a script program to check whether the update installation package 202 has been announced and the at least one application should be updated. Or, the auto triggering module 410 simulates the user's operation (simulate the users' interface operation of operating a mouse or a keyboard to click the menu on the screen) by using a tool (such as a software tool) to activate an update interface and perform an update operation of the at least one application.

In safety confirmation step, during the process of downloading the update installation package 202 from the network, the safety checking module 412 assures that the download source of the update installation package 202 is a reliable installation source by blocking active connection of external network (for example, external host is not allowed to be actively connected to the update detector 106, lest unknown program might be loaded to the update detector 106) and checking a website address of a download point of the update installation package 202 (that is, the website address of a server on the network from which the user downloads the update installation package), lest unknown programs or malicious programs might be loaded to the update detector 106. The safety checking module 412 also denies the storage of unknown data. Moreover, the update detector 106 has its own whitelist capable of blocking unknown programs to assure that the programs and software installed on the update detector 106 are safe and reliable.

In the update information submission step, after the update installation package 202 is executed, the update collection module 414 of the update detector 106 collects the generated updaters and transmits a report information recording the information of the updaters generated by the update detector 106(1) after executing the update installation package and the information of sampled executable files to the update management server 104.

In the filtering step, the filter 402 of the update management server 104 searches the intersection of update data from the collected report information and filters out unknown programs or malicious programs not included in the intersection to obtain an updater list. To assure that the detected data is legitimate and reliable, the update detector 106 of the present embodiment is strictly protected. By providing the design of checks from the safety confirmation step to the filtering step, the unsafe software is avoided and reliable update information is generated.

In the legitimacy confirmation step, the recognizer 404 determines whether the update installation package is legitimate according to the number of update detectors 106 having transmitted the report information.

In the update information storage step, the database 408 stores the above updater list.

In the update information access step, the process processor 420 of the whitelisted host 102 inquires the query service unit 406 of the update management server 104 about the updater list and the sampled executable files.

In the updater tracking step, after the update operation of the whitelisted host 102 is activated, the process processor 420 executes the update installation package, and the executed update installation package generates necessary updaters. New executable files can be found by tracking the updaters. Each process that the system is going to perform is continuously monitored. Whether the currently performed process is listed in the updater list obtained from the update management server 104 is determined. If yes, the current program is regarded as a safe program, and the file access operation of this program is tracked.

In the new executable file collection step, after it is determined that the currently performed process is listed in the updater list obtained from the update management server 104, the update executer 416 collects a number of executable files generated after a number of updaters are executed, and adds the executable files to the application whitelist database 424 of the whitelisted host 102, such that the executable files can be executed by the whitelisted host 102.

Figure 5:
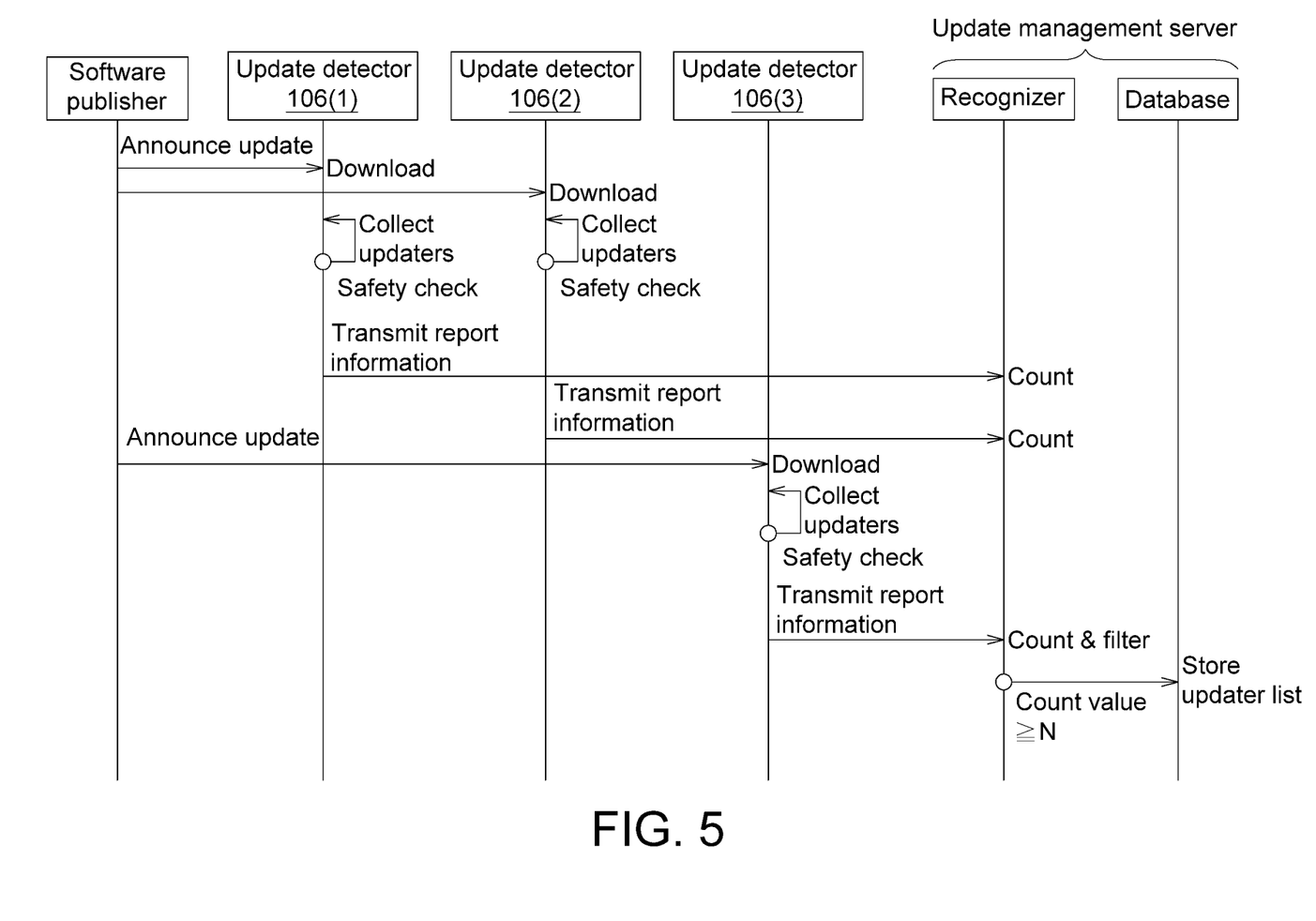
FIG. 5 is an example of a sequence diagram of recognizing legitimate update by an update management server.

Referring to FIG. 5, an example of a sequence diagram of recognizing legitimate update by an update management server is shown. After the software publisher announces an update on the network, a number of update detectors 106 respectively download the update package from the network. After the update detectors 106 collect the updaters and perform safety check, the update detectors 106 transmit the report information to the update management server 104. The recognizer 404 of the update management server 104 counts the number of update detectors 106 having transmitted the report information to the update management server 104. If the number is greater than or equal to a threshold value N (N is a positive integer), the update management server 104 stores the updater list in the database 408.

Figure 6:
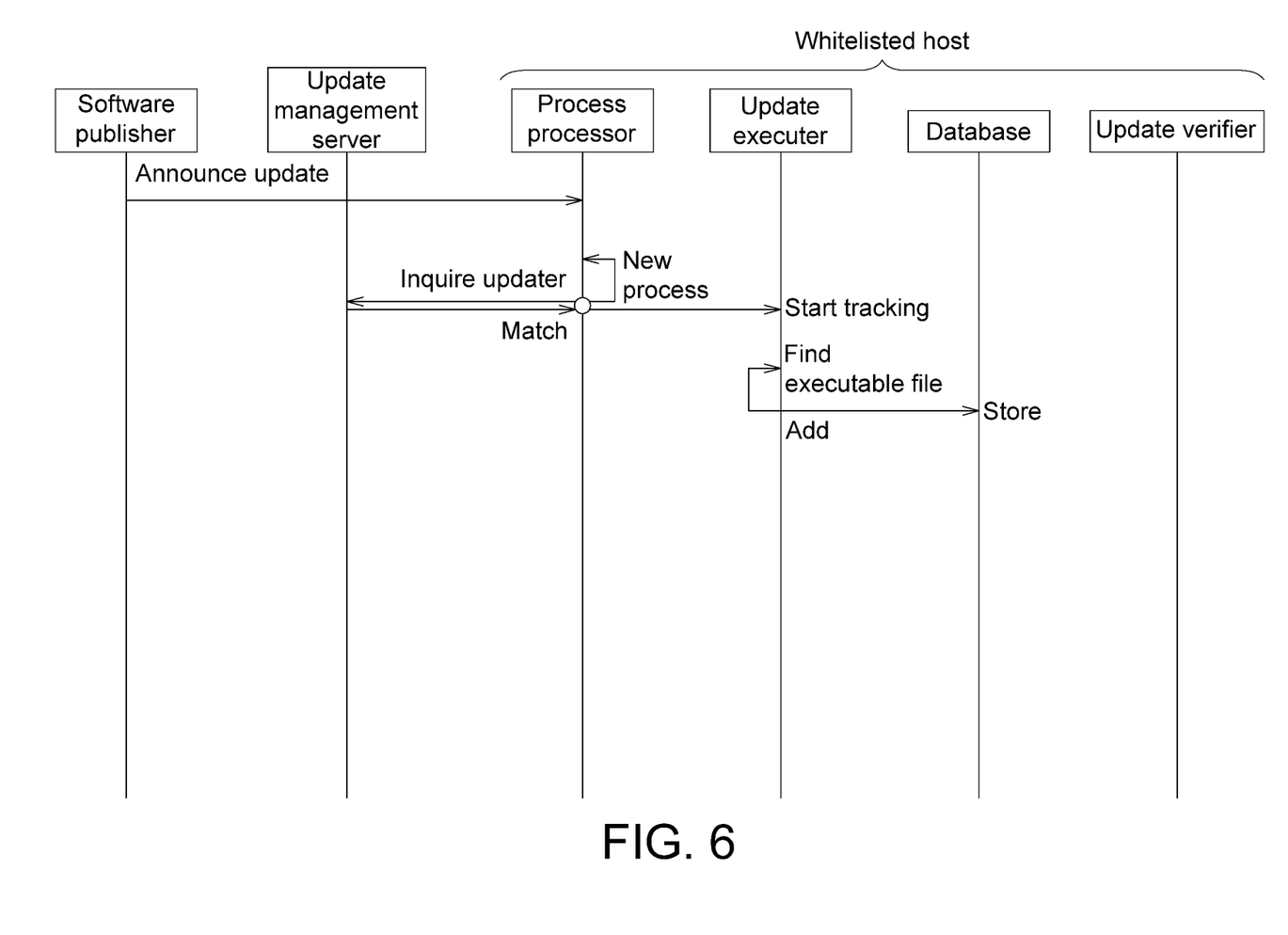
FIG. 6 is an example of a sequence diagram of performing an update process by a whitelisted host.

Referring to FIG. 6, an example of a sequence diagram of performing an update process by a whitelisted host is shown. After the software publisher announces an update on the network, one of the whitelisted hosts 102 downloads the update package from the network. The process processor 420 of the whitelisted host 102 inquires the update management server 104 about whether the currently performed process matches the updater list recorded by the update management server 104. When at least one process matches the updater list, the update executer 416 starts to track these new processes. If an executable file can be found from these processes, the executable file is added to the application whitelist of the whitelisted host 102 and stored in the database 424.

The said updater list discloses a complete update process. To check whether the whitelisted host performs the update operation according to the updater, update verification is activated. Based on the detection method disclosed above, the present embodiment further provides an update verification method, which is executed by a preconfigured whitelisted host of the at least one whitelisted host 102. The update verification method includes the following steps. Firstly, the preconfigured whitelisted host receives an updater list, and enters a verification process over a period of the time when file activities are in an idle state. During the verification process, the preconfigured whitelisted host looks up an execution log and checks whether all of the at least one candidate updater of the updater list has been tracked. If no, it is determined that the update is incomplete. During the verification process, the preconfigured whitelisted host looks up an application whitelist of the preconfigured whitelisted host and checks whether each of the at least one sample executable file is already listed in the application whitelist of the preconfigured whitelisted host. If no, it is determined that the update is incomplete.

Then, if the preconfigured whitelisted host determines that the update is incomplete, the preconfigured whitelisted host downloads the update installation package from the update management server and executes the downloaded update installation package to re-activate the update process and re-collect new executable files.

Figure 7:
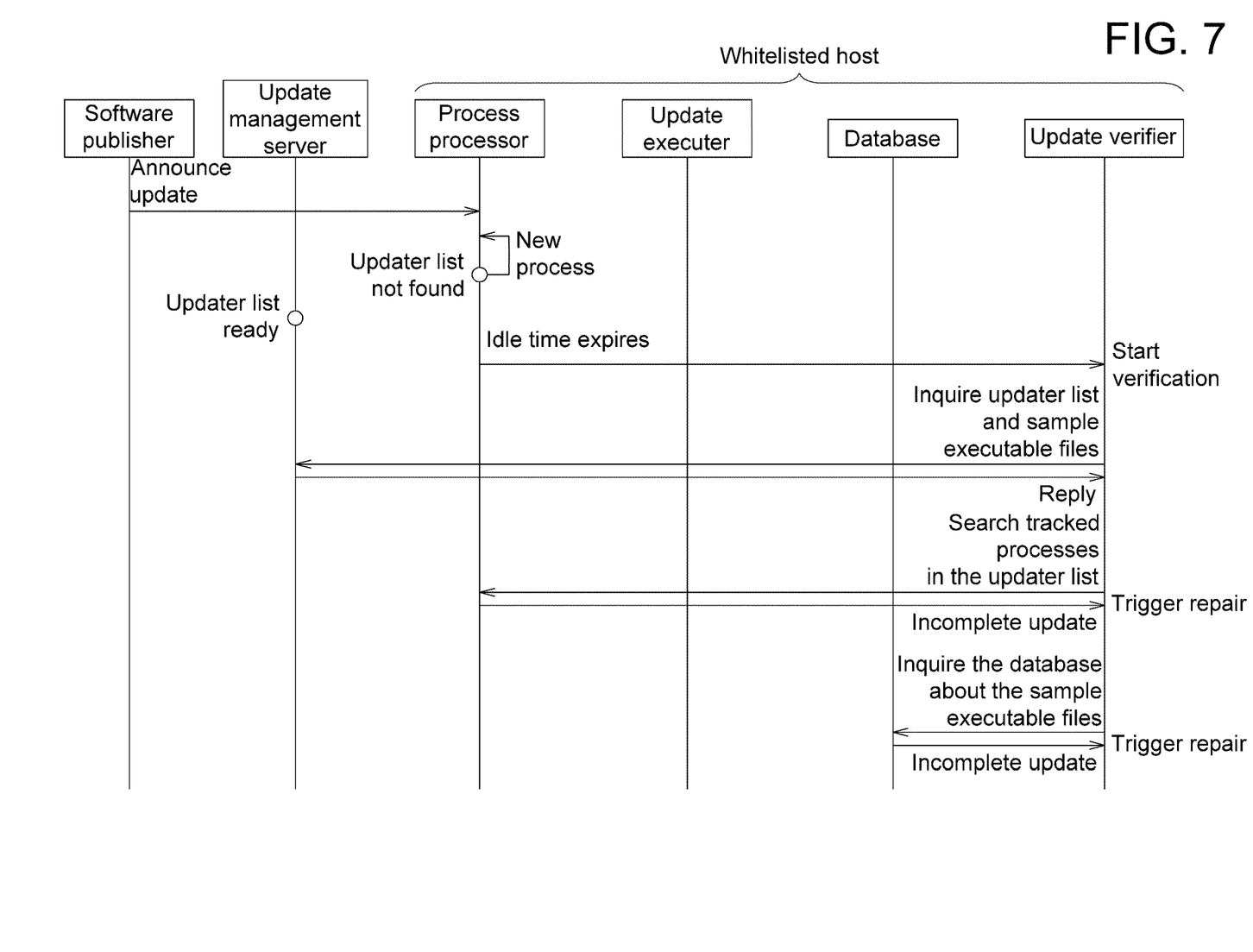
FIG. 7 is an example of a sequence diagram of verifying update by a whitelisted host.
Figure 8:
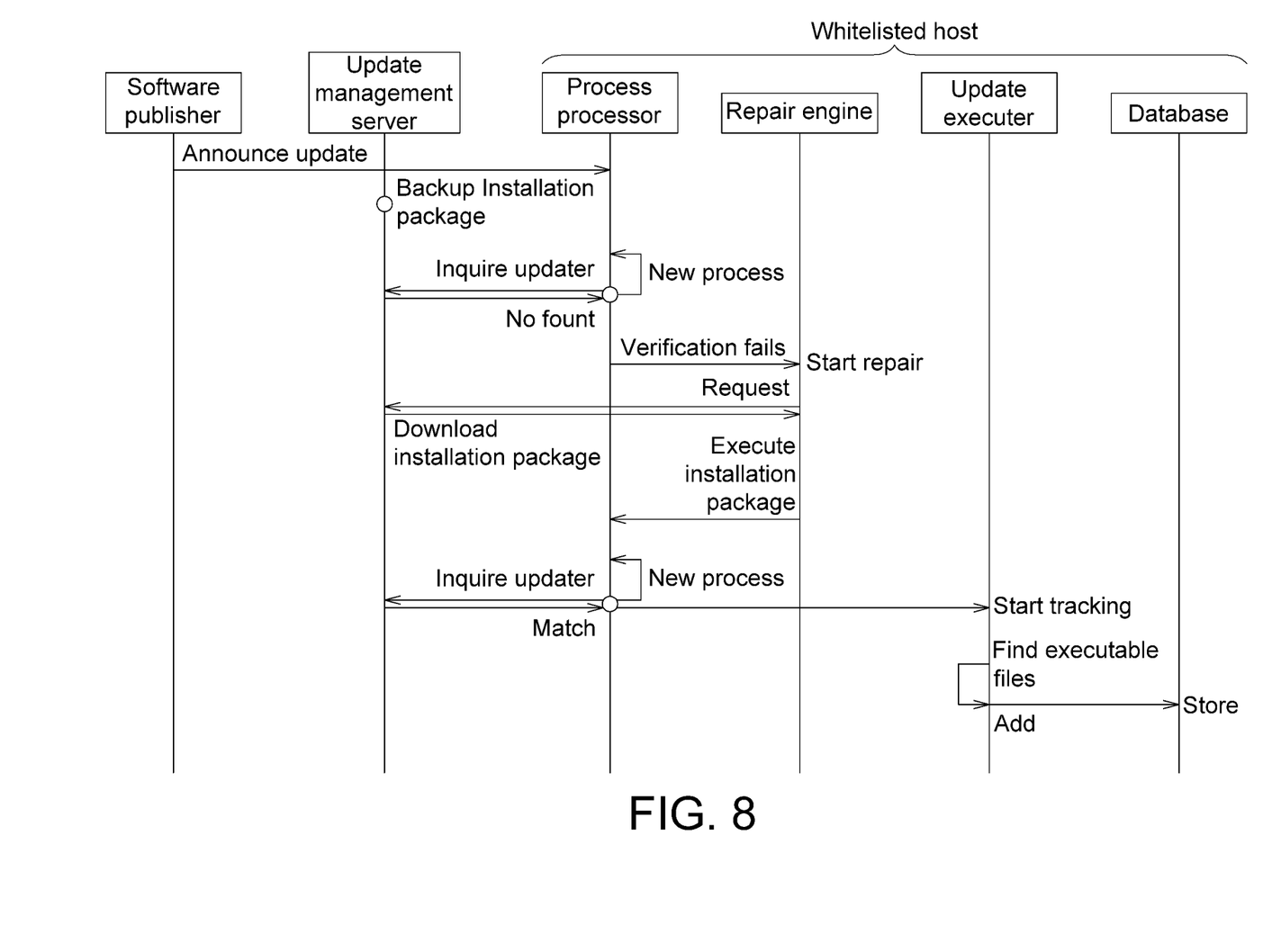
FIG. 8 is an example of a sequence diagram of repairing update by a whitelisted host.

The above update verification method is further explained by using the sequence diagram of FIG. 7 and FIG. 8. Referring to FIG. 7, an example of a sequence diagram of verifying update by a whitelisted host is shown. After the software publisher announces an update on the network, one of the whitelisted hosts 102 downloads the update package from the network. When the process processor 420 of the whitelisted host 102 inquires the update management server 104 about the updater list, the updater list has not been found by the update management server 104. Meanwhile, the process processor 420 of the whitelisted host 102 executes the update package and generates a new process. When the updater list of the update management server 104 is ready, the update verifier 418 starts to perform verification once the idle time expires. The update verifier 418 inquires the update management server 104 and asks the update management server 104 to provide an updater list and sample executable files. The update management server 104 replies and provides the updater list and the sample executable files. The update verifier 418 searches the log of the process processor 420 and checks whether all updaters in the updater list have been tracked. If it is determined that the update is incomplete, the update verifier 418 triggers a repair process. The update verifier 418 inquires the database 424 and checks whether all of the sample executable files already exist. If the update is incomplete, the update verifier 418 also triggers the repair process.

Referring to FIG. 8, an example of a sequence diagram of repairing update by a whitelisted host is shown. After the software publisher announces an update on the network, the update management server backs up an update installation package. The process processor 420 of the whitelisted host 102 inquires the update management server 104 about the updaters but does not find any. Meanwhile, the process processor 420 of the whitelisted host 102 executes the update installation package and generates a new process. As expected, the update operation cannot be correctly performed. If verification fails, the repair engine 422 starts to perform the repair operation. The repair engine 422 provides a request to the update management server 104, and downloads the update installation package from the update management server 104. The process processor 420 executes the update installation package, and enters the normal tracking process as expected. The process processor 420 inquires the update management server 104 about the updaters. If the updaters can be found, the update executer 416 starts to track these updaters. If executable files can be found, the update executer 416 adds the executable files to the application whitelist and stores the application whitelist in the database 424.

According to an embodiment, a detection method for determining whether an update of at least one application installed on at least one whitelisted host is legitimate is provided. The method includes the following steps. Firstly, an update management server and a number of update detectors are provided, wherein each update detector is installed with the at least one application. During a process that software automatic update occurs in each update detector and an update installation package is executed for performing an update operation of the at least one application, the executed update installation package correspondingly generates at least one updater. Each update detector checks a download source of the update installation package and transmits a report information to the update management server, wherein the report information includes information of the at least one updater and information of the sampled executable files. The update management server obtains a number of update detectors having performed the update operation of the at least one application by using the update installation package according to the report information of each update detector. If the number of update detectors having performed the update operation is greater than or equivalent to a threshold value, the update management server determines that the update is legitimate.

According to the detection system, the detection method, and the update verification method performed by using the detection method of the disclosure, the legitimate application update (the legitimate update installation packages) are recognized and improper programs (unknown or malicious programs) are excluded, update packages can be immediately found, corresponding updaters can be immediately tracked, and newly generated executable files can be added to the application whitelist. The system and method of the disclosure are particularly adaptable to the situations where the number of whitelisted hosts is large such as large factories or a number of machines on the production line. The system and method of the disclosure are installed with automatic software update, which replaces manual setting of the application whitelist of the whitelisted host with the detection system with update detectors, not only greatly reducing manual operation time and users' burden but also avoiding user errors. The system and method of the disclosure can generate a safe and reliable updater list without relying on manual judgment or external whitelist verification unit, and can be easily expanded to support new applications. The system and method of the disclosure are indeed very convenient and labor saving. The updaters and the executable files generated by the updaters are added to the application whitelist, such that the applications can be executed subsequently. Thus, the whitelisted host can be provided with excellent safety protection, and the application software can be successfully upgraded or updated.

While the disclosure has been described by way of example and in terms of the preferred embodiment(s), it is to be understood that the disclosure is not limited thereto. On the contrary, it is intended to cover various modifications and similar arrangements and processes, and the scope of the appended claims therefore should be accorded the broadest interpretation to encompass all such modifications and similar arrangements and processes.

What is claimed is:

1. An update verification method performed by using a detection method, wherein the update verification method is performed by a preconfigured whitelisted host of the at least one whitelisted host, and comprises:
the detection method for determining whether an update of at least one application installed on at least one whitelisted host is legitimate, comprising:
providing an update management server and a plurality of update detectors, wherein each update detector is installed with the at least one application;
during a process that software automatic update occurs in each update detector and an update installation package is executed for performing an update operation of the at least one application, the executed update installation package correspondingly generating at least one updater, wherein each update detector checks a download source of the update installation package and transmits a report information, comprising information of the at least one updater and sampled executable files, to the update management server; and
obtaining a number of update detectors, having performed the update operation of the at least one application by using the update installation package, by the update management server according to the report information of each update detector, wherein if the number of update detectors having performed the update operation is greater than or equivalent to a threshold value, the update management server determines that the update is legitimate;
generating an updater list by the update management server according to each report information transmitted by each update detector, wherein the updater list contains at least one candidate updater being the at least one updater shown in each of the report information of the update detectors having transmitted the report information to the update management server;
the update verification method, comprising:
receiving the updater list by the preconfigured whitelisted host, and entering a verification process over a period of the time when file activities are in an idle state;
during the verification process, looking up an execution log and checking, by the preconfigured whitelisted host, whether all of the at least one candidate updater of the updater list has been tracked, if no, it is determined that the update is incomplete;
during the verification process, looking up an application whitelist of the preconfigured whitelisted host and checking, by the preconfigured whitelisted host, whether each of at least one sample executable file is already listed in the application whitelist of the preconfigured whitelisted host, if no, it is determined that the update is incomplete; and
when the preconfigured whitelisted host determines that the update is incomplete, downloading the update installation package from the update management server and executing the downloaded update installation package by the preconfigured whitelisted host to re-activate update process and re-collect new executable files.

2. The update verification method according to claim 1, wherein the detection method further comprises:
when the at least one whitelisted host wants to perform an update operation of the at least one application, receiving an inquiry from the at least one whitelisted host and transmitting a legitimate updater list to the at least one whitelisted host by the update management server according to a determination of whether a collected updater list is legitimate.

3. The update verification method according to claim 1, wherein the detection method further comprises:
when the at least one whitelisted host wants to perform an update operation of the at least one application, the update management server receiving an inquiry from the at least one whitelisted host, the update management server providing the updater list to the at least one whitelisted host according to the updater list, wherein the at least one whitelisted host updates an application whitelist of the at least one whitelisted host according to the updater list.

4. The update verification method according to claim 3, wherein the update management server comprises:
a filter configured to filter out illegitimate programs in the report information to generate the updater list;
a recognizer configured to determine whether the update installation package is legitimate according to the number of update detectors;
a query service unit configured to receive the inquiry from the at least one whitelisted host and transmit a legitimate updater list to the at least one whitelisted host; and
a database configured to store the updater list.

5. The update verification method according to claim 1, wherein each of the update detectors comprises:
a safety checking module configured to assure that the download source of the update installation package is a reliable installation source; and
an update collection module configured to collect the information of the at least one updater and use the information of the at least one updater as the report information.

6. The update verification method according to claim 5, wherein each of the update detectors comprises an auto triggering module configured to automatically activate the update operation of the at least one application.

7. The update verification method according to claim 6, wherein the auto triggering module continuously re-boosts corresponding update detector or re-activates the at least one application by using a script program to check whether the update installation package has been announced and triggers the at least one application to perform the update operation, or, the auto triggering module simulates a user's operation by using a tool to activate an update interface and perform an update operation of the at least one application.

8. The update verification method according to claim 5, wherein the safety checking module assures that the download source of the update installation package is the reliable installation source by blocking active connection of external network and checking a website address of a download point of the update installation package.

9. The update verification method according to claim 1, wherein the number of update detectors corresponds to the number of update detectors having performed the update operation of the at least one application by using the update installation package within a time interval relevant to a current time point.

10. The update verification method according to claim 1, wherein version of the at least one application installed on each update detector is the same as version of the at least one application installed on the at least one whitelisted host, version of operating system installed on each update detector is the same as version of operating system installed on the at least one whitelisted host, the executed update installation package is unzipped or unpacked to generate the at least one updater, which generates at least one new executable file.

* * * * *